C. E. DULIN.
BOOK-CLAMP.

No. 186,927.                          Patented Feb. 6, 1877.

Witnesses                                Inventor
Jno. D. Patten                    Charles E. Dulin
R. E. Grant                       By Atty. R. T. Campbell

UNITED STATES PATENT OFFICE.

CHARLES E. DULIN, OF PHILADELPHIA, PENNSYLVANIA.

IMPROVEMENT IN BOOK-CLAMPS.

Specification forming part of Letters Patent No. 186,927, dated February 6, 1877; application filed December 20, 1876.

*To all whom it may concern:*

Be it known that I, CHARLES E. DULIN, of the city and county of Philadelphia, in the State of Pennsylvania, have invented a new and Improved Book-Clamp; and I do hereby declare that the following is a full, clear, and exact description thereof, reference being had to the accompanying drawings, making part of this specification, in which—

Figure 1:
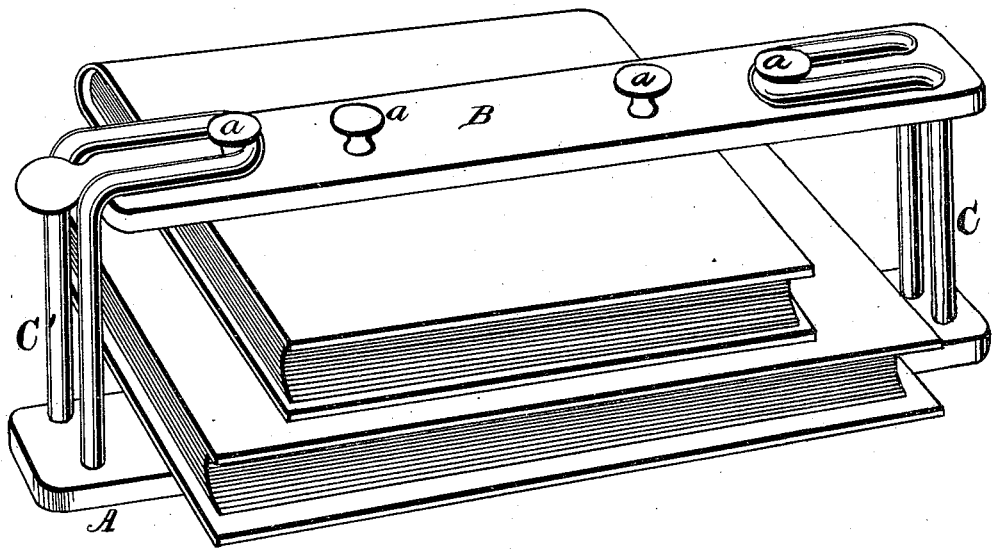
Figure 2:
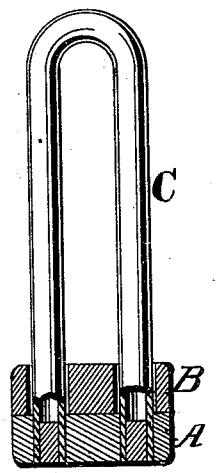
Figure 4:
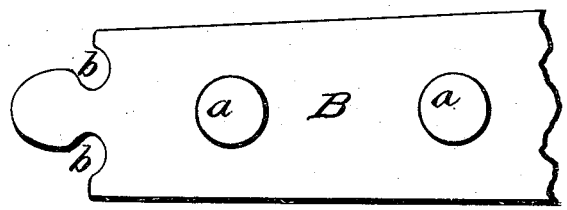

Figure 1 is a perspective view of the book-clamp, illustrating several books confined between its two bars. Figs. 2 and 3 are details of the clamp.

Similar letters of reference indicate corresponding parts in the several figures.

This invention has relation to devices which are especially designed for clamping together children's school-books; and the nature of my invention consists in two clamping-bars, between which the books are confined, the lower one of which bars has secured to it, near its ends, elastic loops, in combination with an upper bar, through one end of which one of said loops passes freely, and which is notched at its opposite end in a peculiar manner, to receive the other loop; also, which is provided with buttons or knobs, to hold the loops when they are adjusted on them, substantially as will be hereinafter explained.

In the annexed drawings, A designates the lower clamping-bar, and B the upper clamping-bar. Both bars A and B may be tapered from the middle of their length to their ends, and they may be made of any desired length and width. C C' designate two loops, which are elastic and secured to the bar A near its ends. The loop C passes loosely through holes made through one end of the bar B, the opposite end of which bar is notched at $b\ b$ to receive the loop C'. Buttons $a\ a\ a\ a$ are fixed to the bar B to receive the loops C C'.

I claim—

A book-clamp having india-rubber loops C C' fixed to the ends of the bar A, in combination with the bar B, provided with buttons $a$ near each end, and notched at $b\ b$, as shown and described.

In testimony that I claim the above I have hereunto subscribed my name in the presence of two witnesses.

CHAS. EDWIN DULIN.

Witnesses:
 GEO. F. EISENHARDT,
 J. JULIUS DOERING.